United States Patent [19]
DiGiovanni et al.

[11] Patent Number: 5,820,834
[45] Date of Patent: Oct. 13, 1998

[54] FLEXIBLE CATALYTIC SUBSTRATE MOUNTING SYSTEM

[75] Inventors: Michael Joseph DiGiovanni, Shelton; John Frederick Bianchi, North Haven, both of Conn.

[73] Assignee: Precision Combustion Inc., New Haven, Conn.

[21] Appl. No.: 829,598

[22] Filed: Mar. 31, 1997

[51] Int. Cl.$^6$ ............................... F01N 3/10; B01D 53/34
[52] U.S. Cl. .................... 422/179; 422/171; 422/177; 422/221
[58] Field of Search ..................................... 422/179, 171, 422/221, 177, 180, 211, 222; 60/299, 300; 428/116, 593, 594; 502/439, 527

[56] References Cited

U.S. PATENT DOCUMENTS

| | | |
|---|---|---|
| 4,043,761 | 8/1977 | Gaysert et al. .......................... 422/179 |
| 5,387,399 | 2/1995 | Nishida et al. .......................... 422/179 |

*Primary Examiner*—Hien Tran
*Attorney, Agent, or Firm*—Kane, Dalsimer, Sullivan, Kurucz, Levy, Eisele and Richard

[57] ABSTRACT

The flexible catalyst mounting system employing a "v" notch for holding flexible catalyst elements. Between any pair of rings a flexible catalyst element or plurality of elements, a stack, are placed. The rings placed between flexible catalyst elements or stacks are designed such that linear compression of a ring forces the ring to axially expand, thereby providing a radial seal to prevent gases from bypassing the flexible catalyst element or stack. The flexible catalyst mounting system can be used with flexible catalyst elements of varying ductility.

9 Claims, 3 Drawing Sheets

FLEXIBLE CATALYTIC SUBSTRATE MOUNTING SYSTEM

BACKGROUND OF THE INVENTION

Field of the Invention

This invention relates to the mounting of flexible catalytic substrates. In one specific application, this invention relates to mounting flexible catalytic substrates in an automotive catalytic converter.

Automotive emissions continue to be reduced as advances are made in catalytic converter technology. The advent of short-channel catalysts, metal substrate and non-metal substrate, (flexible catalyst) presents an opportunity to increase the overall performance of the automotive converter while at the same time reducing the overall space of the converter, thus allowing more flexibility in the placement of the converter within the overall design of the engine exhaust system.

It is well understood in catalytic converter design that a key issue in maximizing the overall efficiency of the converter is to assure that the maximum amount of exhaust gas in the exhaust stream reacts with the catalyst. Although many factors determine the overall efficiency of the catalyst's ability to convert the exhaust gas, ultra low emissions can only be achieved if by-pass is effectively and efficiently controlled. By-pass is the condition that exists when exhaust gas is allowed to go through the converter without coming in contact with the catalyst. Therefore, any mounting means for a flexible catalyst must not only meet the objective of placing the catalyst in an exhaust gas stream but must be capable of preventing by-pass.

Converters which employ ceramic bricks as the catalyst have numerous ways in which mounting with minimal by-pass is achieved. The most effective devices rely on compressing a mat material placed between the brick and the converter housing containing which the brick. The use of these mat materials relies on the inherent structure of the brick and the housing for support. In other words, the mat is sandwiched between the brick and the housing with the radial forces of compression being sustained by the housing and the brick. The degree of compression is determined by the need to achieve a seal both between the housing and the mat, and the mat and the brick. Therefore, the mounting system relies upon the inherent compressive strength of the brick.

Flexible catalysts, however, do not have the inherent radial strength of a brick, therefore a new and different mounting system is required. This mounting system in addition to working within the extreme heat of the converter must both hold multiple flexible catalyst elements securely in the converter, and it must prevent gas by-pass.

One method for mounting a short channel material, such as a screen, is to use a flat unshaped channel into which the short channel material is secured using a gasket. This method is typified by a conventional screen door. The difficulty of using a flat "u" shape for sealing short channel material in this application is two fold. First, in multiple screen applications radial sealing will be compromised because of the inherent hoop strength of a cylinder. Second, the high frontal area would require a very high axial load to achieve the same frontal sealing force per square inch as a single point contact seal would have given for the same axial load.

The use of a ridged flange with a hole in the interior would also be possible. The flange, much like a washer, would be slipped into a sleeve and then the multiple flexible catalysts would be inserted and the a second flange would be placed on top. This method, however, without a sealing means between the converter and the flange will allow for significant by-pass.

It has now been found that a compressive ring design can be used which will simultaneous hold multiple flexible catalysts, pull the flexible catalyst taut, and prevent gas by-pass.

SUMMARY OF THE INVENTION

The flexible catalyst mounting system comprised a long fixed ring, a series of individual rings, and a bottom ring which when compressed together form an assembly suitable for holding flexible catalyst elements. Each ring has a "v" notch. The "v" notch of each ring has a similar shape to assure the maximum area of surface contact when the rings with the flexible catalysts installed between them are compressed. There are two primary contact areas, one on each side of the "v".

Between any pair of rings a flexible catalyst element or plurality of elements, a stack, is placed.

A stack can consist of any number of flexible catalyst elements. The maximum number of flexible catalytic elements can vary significantly being a function of the flexibility of the elements and the compressive forces required to secure the flexible catalyst elements in the assembly. To accommodate multiple stacks, individual rings, are inserted between the stacks. The rings (long fixed, bottom, and individual) are compressed along with the flexible catalyst element or stack, bottom ring toward the top (long fixed ring 3, see FIG. 2B). After compression, the bottom ring is attached to the long fixed ring.

The individual rings are designed such that the compression of the ring forces the ring to radially expand, thereby providing a radial seal with the long fixed ring. As a result of compression, the exhaust gas is prevented from by-passing the flexible catalyst elements by three barriers. The first two areas 32, 34 are the areas of compression around the "v" see FIG. 2B. The third is the seal formed by the individual ring 4 and the long fixed ring 3. In addition, even if exhaust gas does enter the "v" ring area, it will enter at a low velocity and be appropriately processed.

The flexible catalyst mounting system can be used with flexible catalyst elements of varying ductility. As the ductility is reduced either through the use of less ductile elements or increased stack size, it may become impractical to rely on the interconnecting "v" shape to bend the flexible catalyst elements to maximize the contact area, so pre-bending of the flexible catalyst therefore might be required.

DETAILED DESCRIPTION OF THE INVENTION

Figure 1:
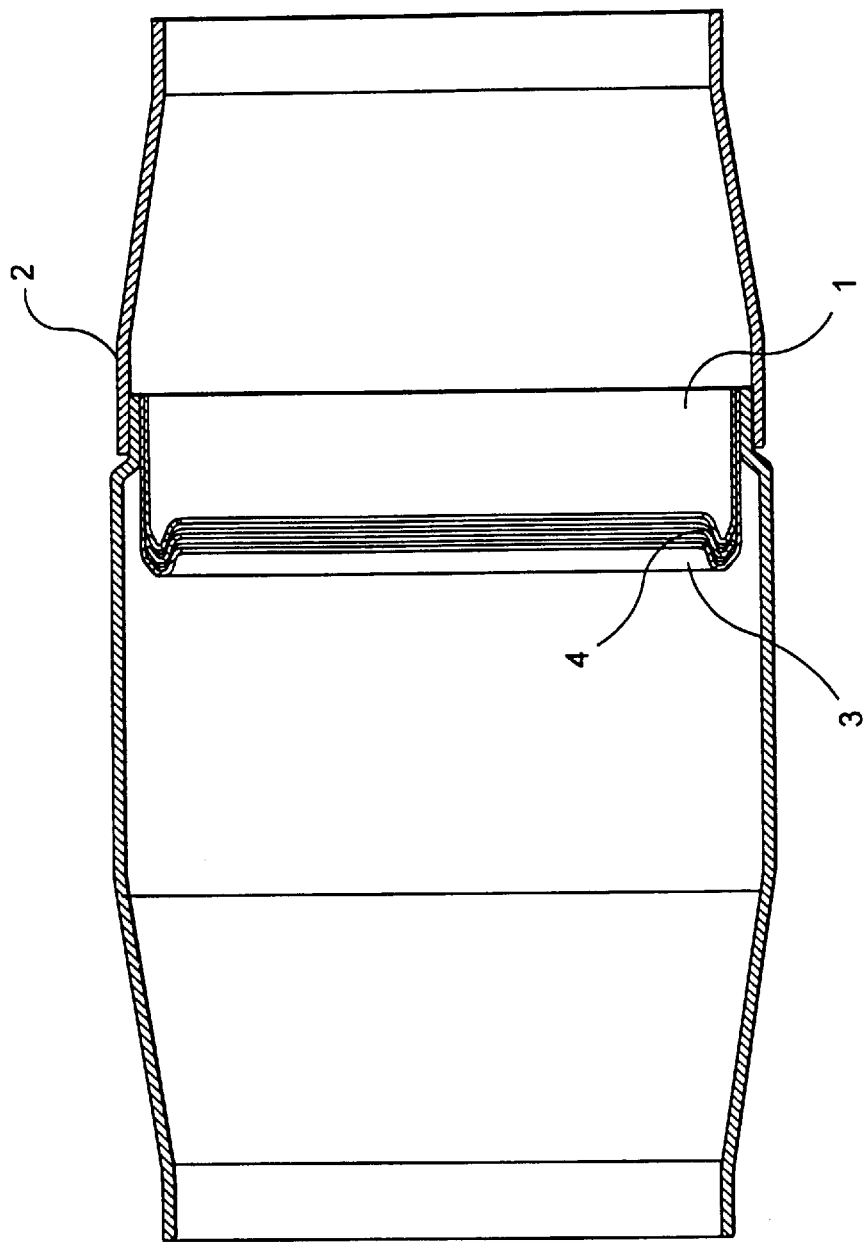
FIG. 1 shows the flexible catalytic substrate mounting system in an automotive converter application, collectively known as the catalytic reactor.

FIG. 1 shows the preferred embodiment of the flexible catalytic substrate mounting system in an automotive catalytic converter can 2. Long fixed ring 3 provides the primary structure for connecting the flexible substrate mounting system and the can, and holding flexible. It would be possible, however, to use the bottom ring 1 as the mounting structure.

Figure 2B:
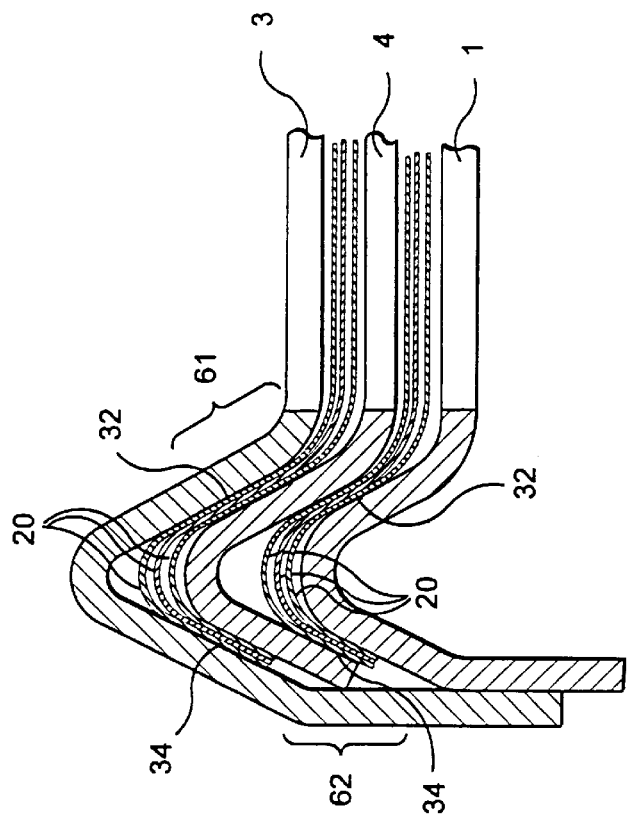
FIG. 2B is the same as FIG. 2A except it shows the mounting system after compression.
Figure 2A:
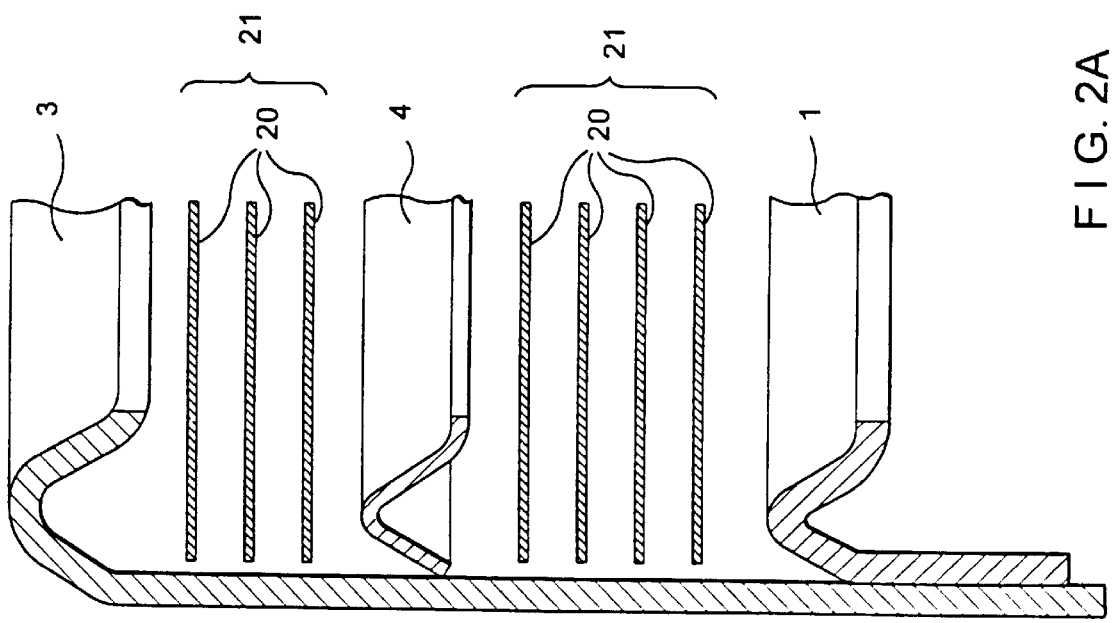
FIG. 2A is an expansion of a cut away of the mounting system showing the bottom ring, long fixed ring, and individual rings prior to compression of the system into its final position.

FIG. 2A is an expanded view of the elements of the flexible catalytic substrate mounting system prior to compression of the elements. Long fixed ring 3 is the element into which the other elements are placed. Individual ring 4 is similar in shape to long fixed ring 3, however lacks any extension to the side. It is also generally of a lighter material. Bottom ring 1 is similar in design to long fixed ring 3 except that it is smaller.

The flexible assembly is constructed by inserting within long fixed ring 3 some number of flexible catalyst elements 20. If more than one flexible catalyst is inserted without an intervening individual ring 4 a stack 21 is formed. Using a wire screen substrate flexible catalyst element, the stack size appears to have a maximum practical limit of 10 screens. Individual ring 4 is used to separate flexible catalyst elements 20 or stacks 21, depending upon design requirements. Bottom ring 1 is inserted into long fixed ring 3 after all flexible catalyst elements and individual rings 4 have been inserted. All rings are installed such that the "v" has the same orientation.

As shown in FIG. 2B, the entire assembly is then linearly compressed until the flexible catalyst elements 20 conform to the "v" notch and the "v" notch of the individual rings 4 have flexed to form a tight, diametrical seal against the long fixed ring 3. The overlap 61 and 62 (see FIG. 2B) of any two rings, should be approximately 50% of the depth of the "v" notch. The precise overlap, however, will be a function of the force required to form the seal between an individual ring 4 and long fixed ring 3, the force required to retain the chosen flexible catalyst 20 or stack 21 in between the rings, and the distance required to place the desired tension in the flexible catalyst elements.

After compression, the bottom ring 1 is secured to the long fixed ring 3 by some means such a welding to the long flexible ring 3 (FIG. 2B). In the preferred embodiment the long fixed ring 3 is attached to the converter can 2 using a gas tight seal, therefore it is typically not critical that a gas tight seal exist between the long fixed ring 3 and the bottom ring 1. Some critical applications, however, might necessitate a gas tight seal to prevent by-pass. Whether the long fixed ring 3 extends beyond the bottom ring 1, the bottom ring 1 extends beyond the long fixed ring 3 or the bottom 1 and long fixed ring 3 are of the same length is based on the ultimate use of the system and the means of attachment to say the automotive converter chosen.

The rings (long fixed ring 3, individual rings 4 and bottom ring 1) all have a similar contour. To maximize the system, the contour should be fair, devoid of sharp turns. In addition, the contour should be such that as compression is taking place equal in-plain tension is applied to the flexible catalyst elements 20. The system works better as the ring contour approaches elliptical or circular. As indicated above, flexible catalysts elements 20 or a stack 21 are placed between the various rings. Flexible catalyst elements are selected based on design requirements. Pre-bending of the flexible catalyst elements to the "v" contour maybe required if the rings lack the structure to perform this deformation during compression. With some flexible catalysts or for multi-stack configurations intermediate compression of the assembly might be considered.

Figure 3:
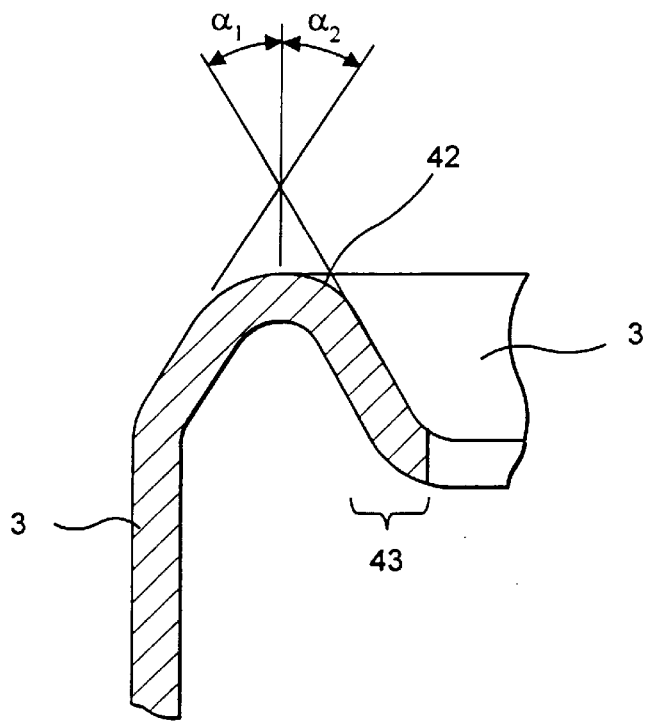
FIG. 3 is a detail view of the "v" notch of an individual ring.
Figure 4:
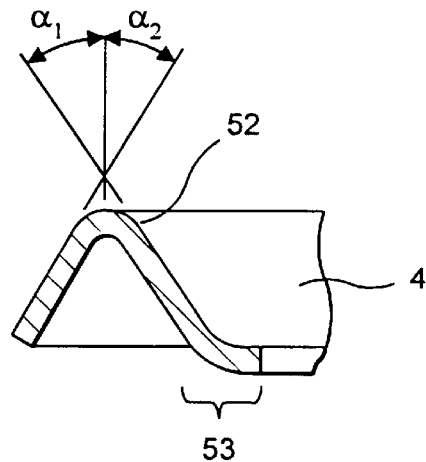
FIG. 4 shows a "v" notch of a long fixed ring.
Figure 5:
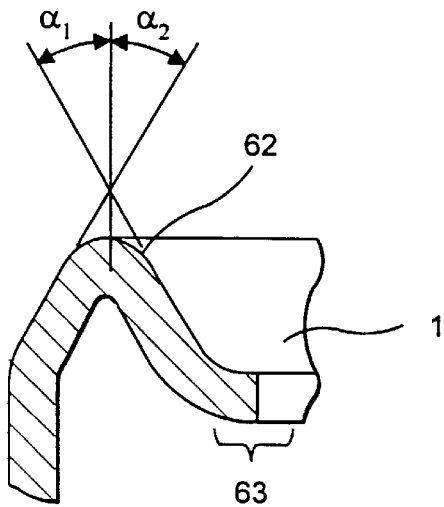
FIG. 5 shows the "v" notch of a bottom ring.

Each of the three ring types contained in the system has a "v" shaped end as depicted in FIGS. 3, 4 and 5. There are minor variations in the size of the notches (length, width, depth) to allow the notches to mesh. Meshing is critical so that the contact area of the rings and the flexible catalyst elements is maximized. The "v" shape depicted in FIGS. 3, 4 and 5 has an angle $\alpha 1$ and $\alpha 2$ between approximately 30 and 45 degrees. It is not critical that $\alpha 1$ and $\alpha 2$ be the same only that the "v" have suitable flexibility so when compressed a mechanical seal is formed between the individual ring 4 and the long fixed ring 3 or bottom ring 1, as applicable. This angle is also optimized for both the number of flexible catalyst elements 20 to be contained between any two rings and the flexibility of the rings to obtain the desired contact area. As either the number of flexible catalyst elements 20 is increased or the ductility of a flexible catalyst element 20 or stack 21 decreases the angle will be greater.

The "v" shape has a radius at the outside upper edge, 42, 52. This radius must be sufficient to avoid cutting into the chosen flexible catalyst element.

On the inner edge of the "v" shape on the long fixed ring 3 and in individual ring 4 is a tail element, 43 and 53. The minimum length of the tail element must be sufficient to provide a radius at the interior edge terminating perpendicular to the flexible catalyst element, 43 and 53. The purpose of the tail is to terminate the "v" notch in such as way as to prevent the ring from damaging the flexible catalyst elements. A tail 63 on the bottom ring 1 is optional.

We claim:

1. A flexible catalytic substrate mounting system for mounting a flexible catalytic substrate in a gas flow comprising:

a) a fixed ring (3) comprising a hollow elliptical column portion having a first end, and a second end, the hollow elliptical column portion at the second end bending to form a first "v" notch;

b) a second ring, comprising a hollow elliptical column portion which is shorter than the hollow elliptical column portion of the fixed ring (3), said hollow elliptical column portion having a first end and a second end, said hollow elliptical column portion of the second ring at said second end bending to form a second "v" notch, of similar contour to said first "v" notch, said second ring sized to slip into said fixed ring, said second "v" notch being angled to mesh into said first "v" notch, said second "v"notch compressed into said first "v" notch, said second ring after compression being attached to said fixed ring, and at least one flexible catalyst element held between said fixed ring and said second ring.

2. The system of claim 1 further comprising at least one individual ring, said individual ring having an outside perimeter of similar shape to said fixed ring and having a third "v" notch similar to said first "v"notch, said individual ring being inserted between said fixed ring and said second ring, said third "v" notch being angled to mesh with any of said first "v" notch, and said second "v" notch.

3. The system of claim 2 wherein said first "v" notch defines a first angle of between 30 and 45 degrees and said second "v" notch defines a second angle of between 30 and 45 degrees.

4. The system of claim 3 wherein said first "v" notch has a round apex and said second "v" notch has a rounded apex.

5. The system of claim 1 further comprising a first tail attached to the second end of said first "v" notch mounted approximately perpendicular to said first.

6. The system of claim 2 wherein said third "v" notch defines an angle between 30 and 45 degrees.

7. The system of claim 6 wherein said third "v" notch has a rounded apex.

8. The system of claim 2 further comprising a second tail, said second tail mounted on the second end of said third "v" notch.

9. The system of claim 2 wherein said individual ring is capable of expanding radially upon compression of said second "v" notch toward said first "v" notch.

\* \* \* \* \*

UNITED STATES PATENT AND TRADEMARK OFFICE
CERTIFICATE OF CORRECTION

PATENT NO. : 5,820,834
DATED : October 13, 1998
INVENTOR(S) : Michael Joseph DiGiovanni and John Frederick Bianchi It is certified that error appears in the above-indentified patent and that said Letters Patent is hereby corrected as shown below:

Col. 1, line 55; "unshaped" should read -- u-shaped -- .

Col. 5, Claim 5, lines 2-3; delete "mounted approximately perpendicular to said first"

Signed and Sealed this

Sixth Day of April, 1999

Attest:

Q. TODD DICKINSON

Attesting Officer

Acting Commissioner of Patents and Trademarks